United States Patent
Chung et al.

(10) Patent No.: US 10,767,814 B2
(45) Date of Patent: Sep. 8, 2020

(54) PRESSURE VESSEL EQUIPPED WITH PERMEATED GAS DISCHARGING STRUCTURE

(71) Applicants: Hyundai Motor Company, Seoul (KR); KIA Motors Corporation, Seoul (KR)

(72) Inventors: Jae Han Chung, Incheon (KR); Hyun Joon Lee, Gyeonggi-do (KR); Ki Ho Hwang, Seoul (KR); Gye Hyoung Yoo, Jeollabuk-do (KR); Seok Bong Heo, Jeollabuk-do (KR); Jong Lyul Kim, Jeollabuk-do (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 70 days.

(21) Appl. No.: 16/302,012

(22) PCT Filed: Apr. 5, 2017

(86) PCT No.: PCT/KR2017/003720
§ 371 (c)(1),
(2) Date: Nov. 15, 2018

(87) PCT Pub. No.: WO2017/200207
PCT Pub. Date: Nov. 23, 2017

(65) Prior Publication Data
US 2019/0162365 A1    May 30, 2019

(30) Foreign Application Priority Data
May 18, 2016 (KR) .................. 10-2016-0060740

(51) Int. Cl.
*F17C 1/02* (2006.01)
*F17C 1/04* (2006.01)
(Continued)

(52) U.S. Cl.
CPC .................. *F17C 1/08* (2013.01); *F17C 1/06* (2013.01); *F17C 2201/0109* (2013.01);
(Continued)

(58) Field of Classification Search
CPC ...... F17C 1/08; F17C 1/02; F17C 1/00; F17C 1/04; F17C 2203/012; F17C 2203/011;
(Continued)

(56) References Cited

U.S. PATENT DOCUMENTS 9,261,239 B2    2/2016    Kanezaki et al.

FOREIGN PATENT DOCUMENTS

| CN | 1074281 A | 7/1993 |
|---|---|---|
| CN | 1749632 A | 3/2006 |

(Continued)

*Primary Examiner* — Fenn C Mathew
*Assistant Examiner* — Alexander Zephir
(74) *Attorney, Agent, or Firm* — Brinks Gilson & Lione (57) ABSTRACT

The present disclosure relates to a pressure vessel equipped with a permeated gas discharging structure, the pressure vessel including a nozzle boss into and from which a gas flows and is discharged; a liner coupled to a flange portion of the nozzle boss and provided with a space formed therein for receiving fluid; a discharge path forming part configured to form a gas discharging path from the nozzle boss side along an outer surface of the liner in a central axial direction; and a composite material provided at outer sides of the liner and the discharge path forming part.

10 Claims, 8 Drawing Sheets

(51) Int. Cl.
  *F17C 1/08* (2006.01)
  *F17C 1/06* (2006.01)

(52) U.S. Cl.
  CPC .. *F17C 2201/056* (2013.01); *F17C 2203/012* (2013.01); *F17C 2203/0604* (2013.01); *F17C 2203/066* (2013.01); *F17C 2203/0617* (2013.01); *F17C 2203/0619* (2013.01); *F17C 2203/0621* (2013.01); *F17C 2203/0663* (2013.01); *F17C 2205/0305* (2013.01); *F17C 2221/011* (2013.01); *F17C 2221/012* (2013.01); *F17C 2221/014* (2013.01); *F17C 2221/033* (2013.01); *F17C 2223/0123* (2013.01); *F17C 2223/035* (2013.01); *F17C 2223/036* (2013.01); *F17C 2260/011* (2013.01); *F17C 2260/037* (2013.01); *Y02E 60/321* (2013.01)

(58) Field of Classification Search
  CPC ........ F17C 13/12; F17C 13/002; F17C 13/00; F16J 12/00
  USPC .......................... 220/581, 585, 586, 587, 588
  See application file for complete search history.

(56) References Cited

FOREIGN PATENT DOCUMENTS

| | | |
|---|---|---|
| CN | 104641163 A | 5/2015 |
| JP | 2013177977 A | 9/2013 |
| JP | 2014081014 A | 5/2014 |
| KR | 101374482 B1 | 3/2014 |
| KR | 20150078702 A | 7/2015 |
| KR | 20160009088 A | 1/2016 |

PRESSURE VESSEL EQUIPPED WITH PERMEATED GAS DISCHARGING STRUCTURE

CROSS-REFERENCE TO RELATED APPLICATION

This application is a continuation of International Application No. PCT/KR2017/003720, filed Apr. 5, 2017, which application claims priority to and the benefit of Korean Patent Application No. 10-2016-0060740, filed on May 18, 2016, the entire contents of which are incorporated herein by reference.

FIELD

The present disclosure relates to a pressure vessel equipped with a permeated gas discharging structure, and more particularly, to a pressure vessel equipped with a structure for discharging a gas, which is permeated through a liner, to the outside.

BACKGROUND

The statements in this section merely provide background information related to the present disclosure and may not constitute prior art.

A pressure vessel is a vessel employed for storing various kinds of fluids such as oxygen, natural gas, nitrogen, hydrogen, etc., and conventionally manufactured by making a nozzle boss and a liner from a metallic material and winding carbon fiber or glass fiber around or stacking on outer sides of the nozzle boss and the liner. In some cases, a conventional pressure vessel manufactured using a metallic liner may be heavy due to the nature of the metal, and may be subject to corrosion, and the manufacturing cost may be relatively high.

Instead of using metal, a plastic liner made of synthetic resin may be manufactured, which may be able to lighten the weight and improve the corrosion resistance compared with the metallic material due to properties of the plastic.

In particular, a Type 4 high-pressure vessel may be manufactured by winding a carbon fiber composite material on a plastic liner in a longitudinal direction and a circumferential direction. A gas such as natural gas or hydrogen gas may be compressed at a high pressure and stored in the high-pressure vessel manufactured as described.

However, if the plastic liner is made of a thermoplastic or thermosetting resin, and the molecular structure of the liner material may be larger than a molecular size of the gas stored in the plastic liner, the gas may escape through a gap between the molecular structures. This phenomenon is referred to as permeation, and the gas escaped through this process is called a permeated gas. Such permeation is distinguished from a leakage in which the gas is leaked due to defects such as a crack between components constituting a connection site or an assembling site or a crack on a material.

As described above, in Type 4 high-pressure vessels, a gas permeation may occur through the plastic liner wall during use. If the permeated gas is trapped in a wall of the composite material and is not properly discharged, pressure between a composite material layer and the liner may be increased, causing the liner to buckle due to the pressure difference between the composite layer and the liner when the gas inside the tank is discharged. In addition, the permeated gas may suddenly be discharged to a periphery of a nozzle or a surface of the tank, which may be mistaken for a leakage and may be recognized as a product defect.

SUMMARY

The present disclosure provides a pressure vessel provided with a gas discharging structure that can quickly discharge a permeated gas to inhibit a liner from buckling and inhibit release of permeated gas from being mistaken for a leakage when a high-pressure vessel is used.

In addition, the present disclosure provides a pressure vessel to which a pretreatment method of a plastic liner for forming a permeated gas discharging path may be applied so as to facilitate discharge of a permeated gas.

A pressure vessel according to the present disclosure may include a nozzle boss into and from which a gas flows and is discharged; a liner coupled to a flange portion of the nozzle boss and provided with a space formed therein for receiving fluid; a discharge path forming part configured to form a gas discharging path from the nozzle boss side along an outer surface of the liner in a central axial direction; and a composite material provided at outer sides of the liner and the discharge path forming part.

The discharge path forming part may include a plurality of rib members formed from the nozzle boss side along the outer surface of the liner in the central axial direction and radially disposed with respect to the central axial direction; and a ring-shaped member to which upper ends of the rib members are secured, the ring member being provided around the outer side of the nozzle boss.

In addition, the rib members may be formed and disposed in the form of umbrella ribs.

Also, the rib members may be provided to be spaced apart from each other.

Further, the rib members may be formed to reach at least portion of a side surface of the liner.

Also, at least some region of the outer surface of the liner may be formed as a pre-treatment region on which any one of a release agent-treatment and a plasma treatment is performed.

In addition, the pre-treatment regions may be formed as a plurality of strip-shaped regions having a length along the outer surface of the liner in the central axial direction, and the plurality of pre-treatment regions may be formed to be spaced apart from each other.

Further, the pre-treatment regions may be formed into a lattice shape.

Also, a separation region in which at least portions of the liner and the composite material are separated from each other may be formed on the liner and the composite material.

In addition, when the release agent treatment is preformed, at least a portion of the separation region may be formed at a position corresponding to the pre-treatment region.

Further, when the plasma treatment is preformed, at least portion of the separation region may be formed to correspond a region except for the pre-treatment region.

A pressure vessel as described in the present disclosure can quickly discharge the permeated gas to inhibit the liner from buckling and can reduce the chances that permeated gas is mistaken for a leakage of gas when the high-pressure vessel is used.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure. It should be understood that throughout the drawings, corresponding reference numbers indicate like or corresponding parts and features.

Unless specifically defined or mentioned, the terms used in this description and indicating the direction are based on a state indicated in the drawings. For the sake of convenience, meanwhile, a thicknesses and dimension of each configuration shown in the drawings may be exaggerated, and it does not mean that the configuration should actually be constructed with the corresponding size or a proportion between the components.

Figure 1:
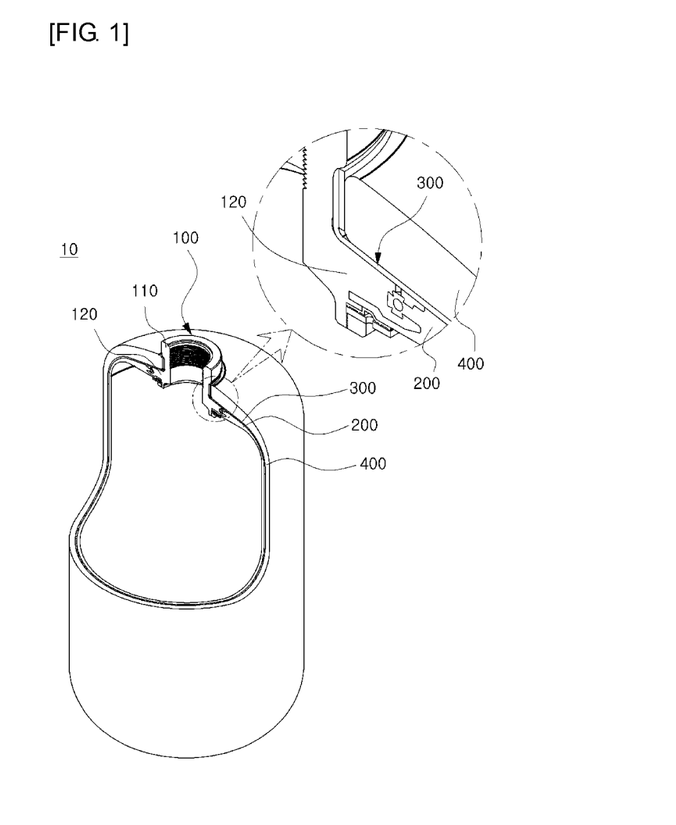
FIG. 1 is an exploded perspective view of a pressure vessel according to the present disclosure.

A pressure vessel according to one aspect of the present disclosure will be described with reference to FIG. 1. FIG. 1 is an exploded perspective view showing a pressure vessel according to one aspect of the present disclosure.

A pressure vessel 10 according to one aspect of the present disclosure is a vessel used to store various kinds of fluid, such as oxygen, natural gas, nitrogen, hydrogen or the like therein, and is provided to enable the above-mentioned fluid to be repeatedly charged and discharged. Here, as illustrated in FIG. 1, the pressure vessel 10 includes a nozzle boss 100 acting as a passage for a charge and a discharge of the fluid, a liner 200 coupled to the nozzle boss 100 to provide a space therein for receiving the fluid, a composite material 400, 400a provided at an outside of the liner 200, and a shock absorbing member 300.

Referring to FIG. 1, the nozzle boss 100 includes a neck portion 110 and a flange portion 120. The neck portion 110 may have an empty space, that is, it may be formed into a hollow shape. The flange portion 120 may be extended outward from approximately a lower end of the neck portion 110 in a radial direction.

The nozzle boss 100 is a configuration functioning as a passage for storing a gas inside the pressure vessel or discharging the stored gas to the outside. At this time, the neck portion 110 is a configuration configured to be connected to an external device, and the flange portion 120 is a configuration configured to be coupled with the liner, which forms a space for storing the gas, to form a closed space. Both portions will be described later in detail.

A thread is formed on a circumferential surface of an upper portion of the neck portion 110. By screw-coupling the neck portion to an external device using the thread formed on the circumferential surface thereof, it is possible to inhibit the fluid from being arbitrarily leaked when the pressure vessel 10 is filled with the fluid or the fluid is discharged from the pressure vessel 10 to the outside.

The flange portion 120 is extended outward from the lower end of the neck portion 110 in the radial direction. The flange portion 120 is one component constituting the above-described nozzle boss 100 and may be formed integrally with the neck portion 110 or may be formed by a mechanical coupling. The flange portion 120 is coupled to the line 200, which will be described later, to form an airtight structure. The nozzle boss 100, that is, the neck portion 110 and flange portion 120 may be manufactured by machining steel, aluminum, plastic or the like.

In addition to the above, the nozzle boss 100 may further include components for improving the airtightness and inhibiting leakage of the internal gas or allowing the internal gas to flow out for a specific purpose, but a description on other detail configurations of the other nozzle boss 100 is omitted below.

The liner 200 according to the present aspect is a kind of barrel having a predetermined internal space, both end portions thereof are formed into a hemispherical shape, and a central portion may be formed into a hollow pipe shape. An upper end portion of the liner 200 is connected to the flange portion 120 of the nozzle boss 100 as described above to form an airtight structure.

After the nozzle boss 100 and the liner 200 are coupled, the composite material 400 may be formed on the outer side of the nozzle boss 100 and the liner 200 to improve pressure-resistance. By impregnating reinforcing fiber such as carbon fiber, glass fiber, synthetic polyamide fiber or the like with a resin such as epoxy resin, or the like, and filament-winding or laminating this resin, the composite material 400 having a predetermined thickness may be formed on the outer side of the liner 200. At this time, the composite material 400 may be wound or laminated from an outer surface of the neck portion 110 of the nozzle boss 100.

Meanwhile, the pressure vessel 10 according to one aspect of the present disclosure is provided with a discharge path forming part 300 between the liner 200 and the composite material 400. The discharge path forming part 300 is provided along the outer sides of the flange portion 120 and the liner 200 from the outer circumferential surface of the neck portion 110. The discharge path forming part 300 functions to form a path between the liner 200 and the composite material 400 for discharging the gas permeated through the liner 200 to the outside.

Figure 2:
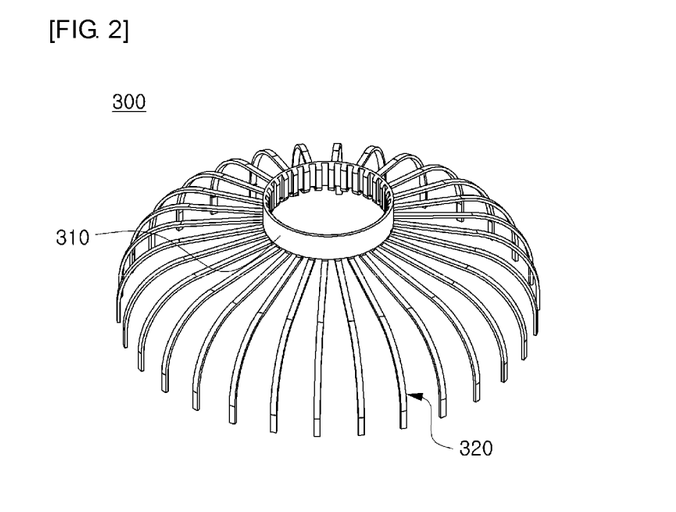
FIG. 2 is a perspective view showing a shape of a discharge path forming part according to the present disclosure.
Figure 3:
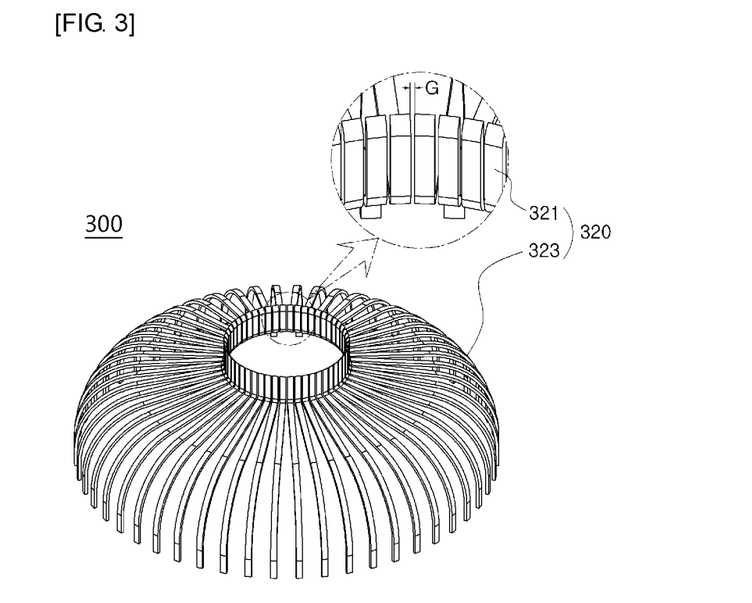
FIG. 3 is a perspective view showing a shape and an arrangement state of rib members according to the present disclosure.
Figure 4:
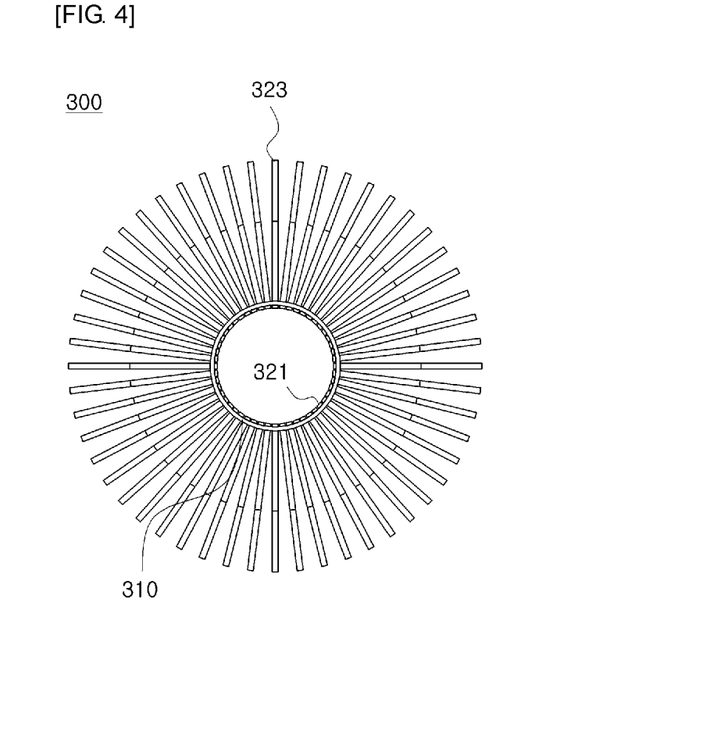
FIG. 4 is a plane view showing a shape of the discharge path forming part in FIG. 2.

The discharge path forming part, according to one aspect, is described with reference to FIGS. 2 to 4. FIG. 2 is a perspective view showing the discharge path forming part according to one aspect of the present disclosure, FIG. 3 is a perspective view showing a shape and an arrangement state of rib members according to one aspect of the present disclosure, and FIG. 4 is a plane view showing a shape of the discharge path forming part in FIG. 2.

As previously described, the discharge path forming part 300 is a configuration that forms a gas discharge path from the nozzle boss side along the outer surface of the liner in the central axial direction.

The discharge path forming part 300 includes a ring member 310 and a rib member 320. As shown in FIG. 3, the rib member 320 is formed into a shape conforming to a shape of the outer surface of the liner from the nozzle boss on a longitudinal sectional face of the pressure vessel. The rib member 320 is formed into a rib shape, and the plurality of rib members 320 are radially arranged. The rib members 320 may be provided spaced apart from each other, a space G between the rib members 320 being employed as a path through which the gas is discharged.

The ring member 310 is formed into a ring shape, and upper end portions 321 of the above described rib members 320 are fixed to the ring member. The upper end portion of the rib member 320 is fixed to an inner circumferential surface of the ring member 310. A lower portion 323 of the rib member 320 is formed to be in close contact with a constant curved face as described above. In other words, the ring member 310 and the rib members 320 are formed and arranged in the shape of umbrella ribs as shown in FIG. 4.

A process for manufacturing the pressure vessel according to one aspect of the present disclosure is described with reference to FIGS. 5 to 8. FIGS. 5 to 8 are views showing the process for manufacturing the pressure vessel according to one aspect of the present disclosure.

As previously described, the liner 200 is coupled to the flange portion 120 of the nozzle boss 100 to form a constant space portion therein. Hereinafter, for convenience of explanation, the pressure vessel 10 is divided into a liner side P1, a shoulder portion P2, a side portion P3 and a lower side curved portion P4 with respect to a longitudinal direction. The above portions are separately described below.

Figure 5:
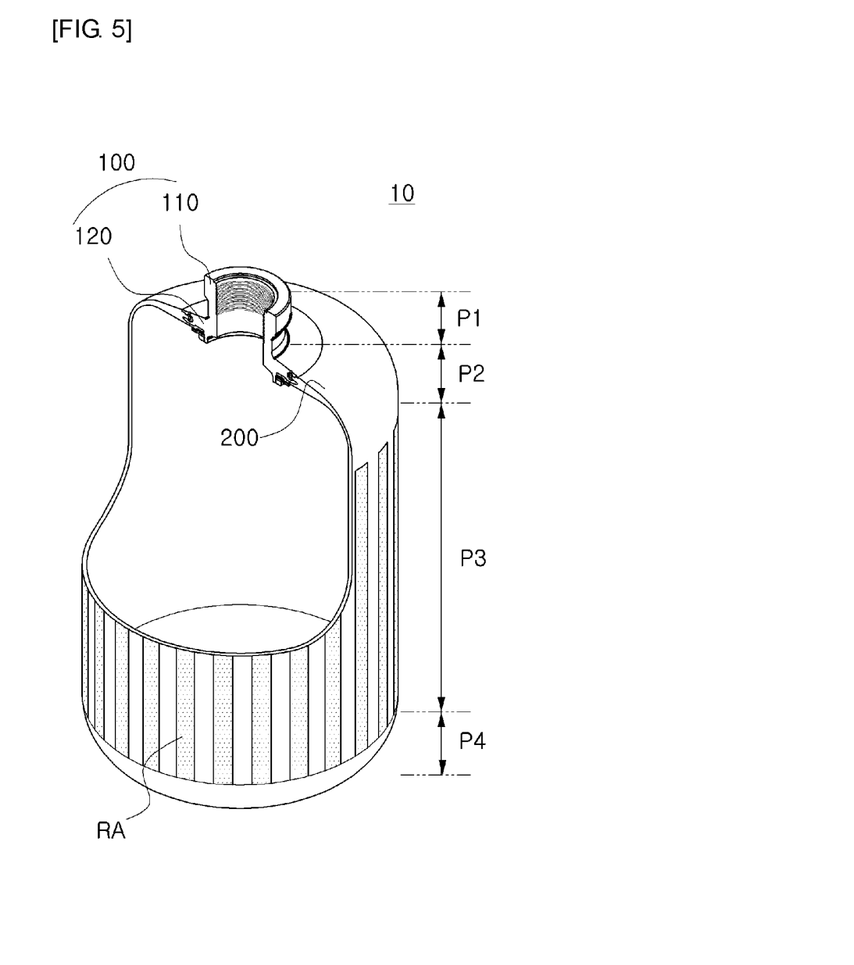
FIGS. 5 to 8 are views showing a process for manufacturing a pressure vessel.

First, at least some region of an outer surface of the liner 200 may be pre-treated by any one of a release agent treatment and a plasma treatment before using and winding the composite material.

Although a pre-treatment region RA on which the pre-treatment is performed may be formed on the side portion P3, it is also possible to form the pre-treatment region RA on the shoulder portion P2 and/or the lower side curved portion P4.

The pre-treatment region RA may be formed as a plurality of strip-shaped regions having a length along the outer surface of the liner 200 in the central axial direction. At this time, the strip-shaped regions may be formed to be spaced apart from each other.

A plasma treatment or a release-agent treatment may be employed as the pre-treatment. For example, a surface of the liner formed of a material, such as a polyethylene (PE), that is not adhered well to the composite material is plasma-treated at regular intervals to enable the composite material impregnated in the epoxy to be adhered well thereon. Meanwhile, a surface of the liner formed of a material, such as a polyamide (PA), that is adhered well to the composite material is treated with the release agent at regular intervals to allow the composite material impregnated in the epoxy not to be adhered well thereon.

By performing the above pre-treatment on some region of the liner 200, after the composite material is wound and the pressure vessel is completed in the future, a phenomenon in which the liner 200 and the composite material wound around or laminated on the outer side of the liner 200 are separated from each other on the pre-treatment region or a region except for the pre-treatment region is generated. In this way, a separation region on which the liner 200 and the composite material are separated from each other is formed on the pre-treatment region, thereby functioning as a constant passage. Such the separation region provides a path that can easily discharge the permeated gas accumulated between the liner 200 and the composite material to the outside together the discharge path forming part 300 (see FIGS. 1 to 4) which is previously described.

Further, the separation region may be formed into a lattice shape. Although the separation region may also be formed into a lattice shape by connecting the pre-treatment regions RA shown in FIG. 5 to each other, this separation may be formed due to natural fine cracks in a bonding zone, or the like caused in the process of forming the liner 200 and the composite material.

Figure 6:
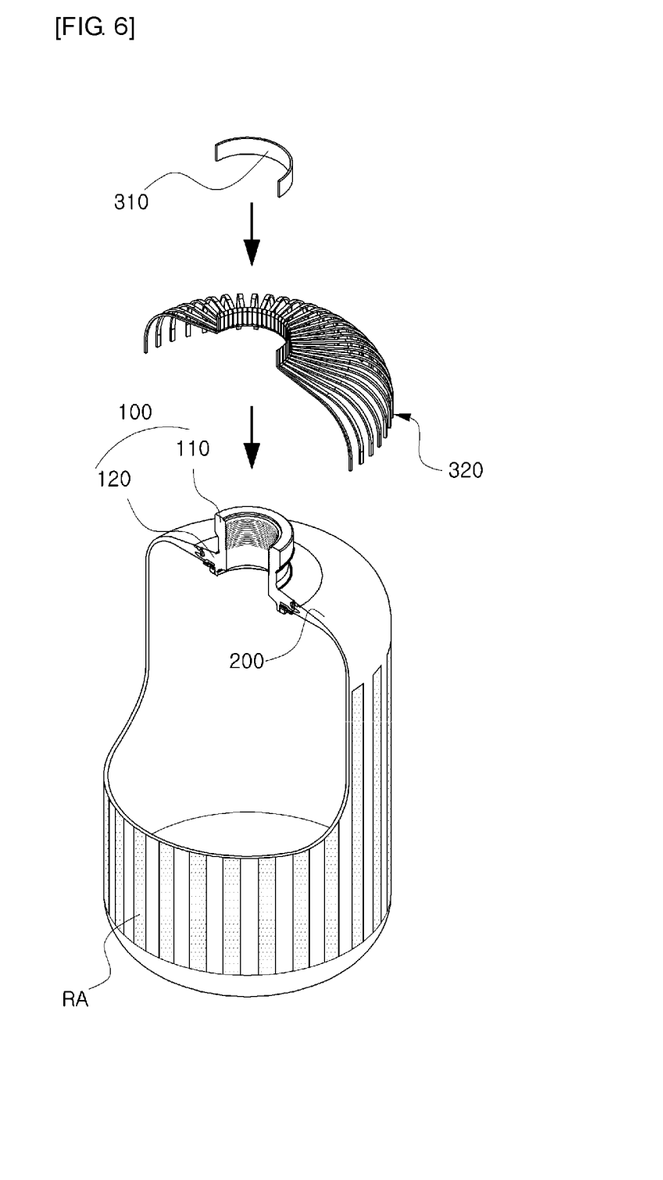
Figure 7:
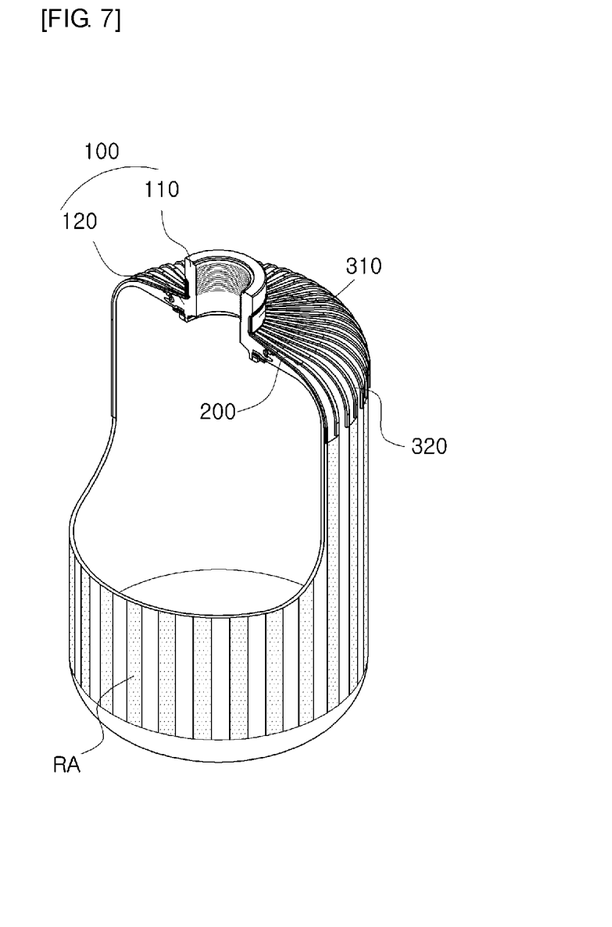

Next, as illustrated in FIGS. 6 and 7, the liner may be covered with the discharge path forming part 310, 320 from the above the liner 200. At this time, it is preferable that the rib members 320 and the pre-treatment region RA are formed to overlap at least portion thereof.

Figure 8:
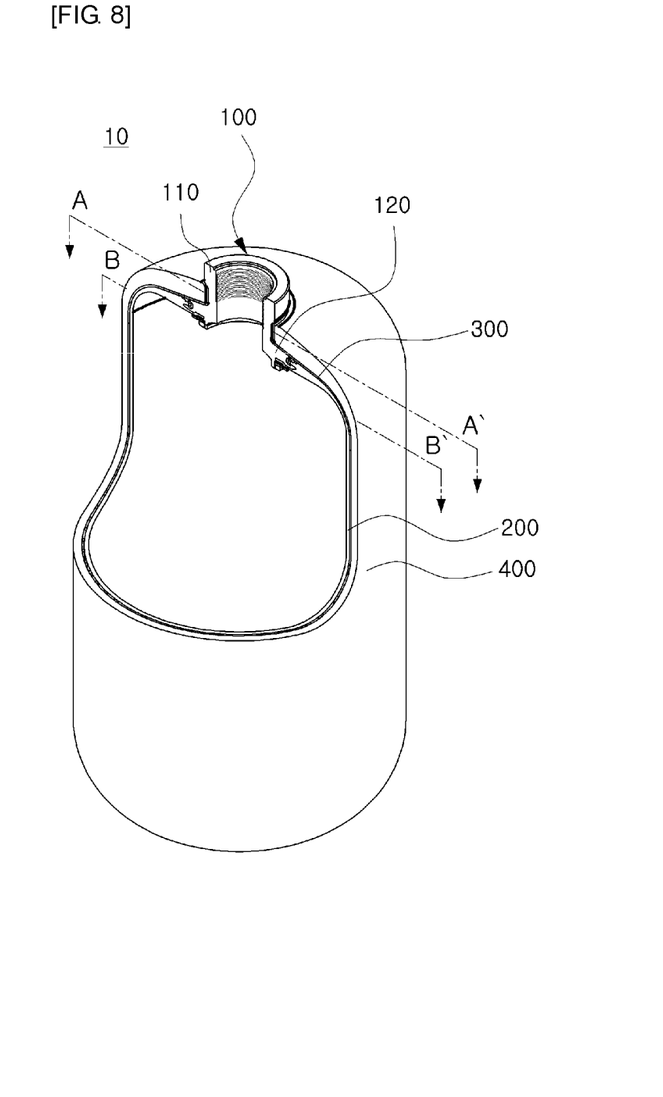

As shown in FIG. 8, when the composite material 400 is wound around or laminated on the outer side of the liner 200 and the discharge path forming part 300, the separation between the liner 200 and the composite material 400 is generated on the pre-treatment region or the region except for the pre-treatment region to form the gas discharging path.

By forming the rib member 320 and the pre-treatment region RA to overlap at least portion thereof, the gas discharging path formed by the discharge path forming part 300 and the discharging path formed between the liner and the composite material by the pre-treatment region RA may be in communication with each other.

That is, the gas permeated through the liner 200 can be easily discharged to the outside through the path formed as described above. In the existing pressure vessel, an insert such as a mesh was employed for discharging the gas, but the pressure vessel according to the present disclosure provides the discharging path without such the insert.

The gas discharging path of the pressure vessel according to the aspect of the present disclosure is described in detail with reference to FIGS. 9 and 10. FIG. FIGS. 9 and 10 are cross-sectional views showing the cut-out states of the nozzle boss and an upper curved portion, respectively.

Figure 9:
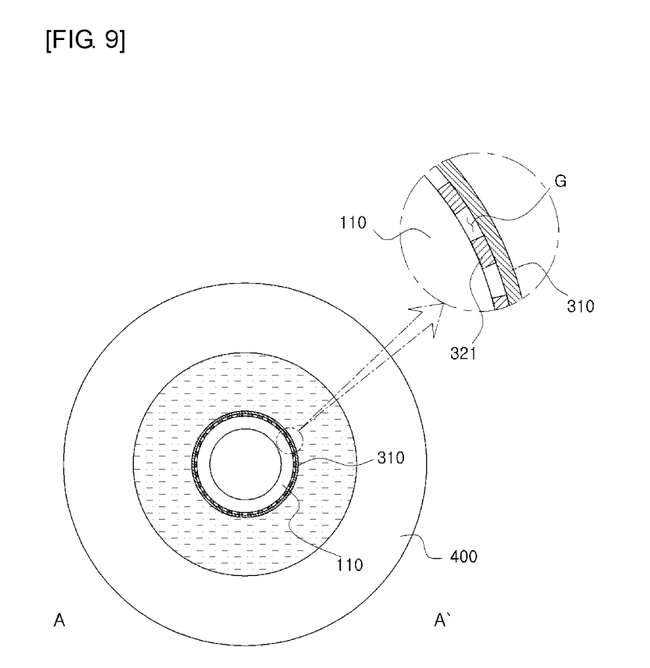
FIGS. 9 and 10 are cross-sectional views showing cut-out states of a nozzle boss and an upper curved portion, respectively.
Figure 10:
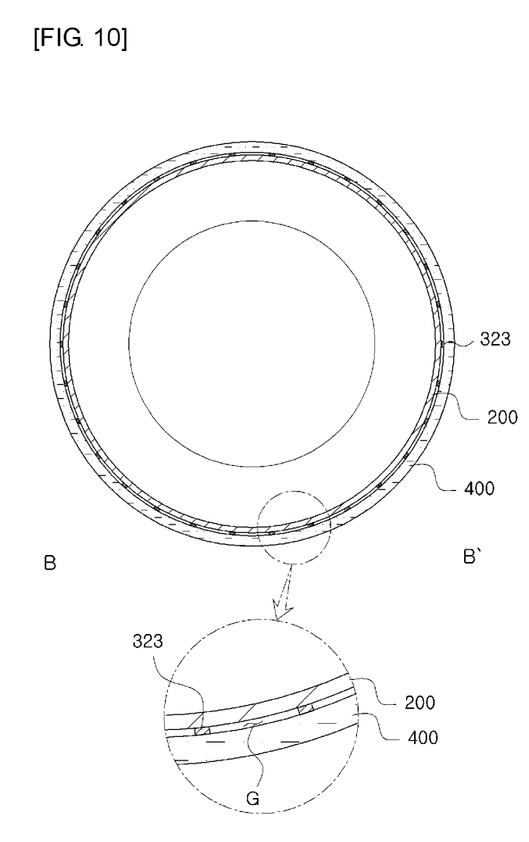

Referring to FIG. 9, the upper end portions 321 of the rib members are interposed between the neck portion 110 and the ring member 310. By forming the upper ends 321 of the rib members to be spaced apart from each other as described above, the constant spaces G are formed. These spaces are provided as the passages for discharging the gas.

Although aspects of the present disclosure have been described as above, the technical spirit of the present disclosure is not limited to the above described preferred aspects and can be variously implemented without departing from the technical spirit of the present disclosure.

The invention claimed is:
1. A pressure vessel comprising:
a nozzle boss into and from which a gas flows and is discharged;
a liner coupled to a flange portion of the nozzle boss and provided with a space formed therein for receiving fluid;
a discharge path forming part configured to form a gas discharging path from a side of the pressure vessel comprising the nozzle boss and along an outer surface of the liner in a central axial direction; and a composite material provided at outer sides of the liner and the discharge path forming part, wherein the discharge path forming part comprises a plurality of rib members formed from the nozzle boss side along the outer surface of the liner in the central axial direction and radially disposed with respect to the central axial direction; and a ring-shaped member to which upper ends of the rib members are secured, the ring-shaped member being provided around an outer side of the nozzle boss.

2. The pressure vessel of claim 1, wherein the rib members are formed and disposed in an umbrella rib configuration.

3. The pressure vessel of claim 1, wherein the rib members are spaced apart from each other.

4. The pressure vessel of claim 1, wherein the rib members are formed to extend to at least a portion of a side surface of the liner.

5. The pressure vessel of claim 1, wherein at least one region of the outer surface of the liner is formed as a pre-treatment region on which any one of a release agent-treatment and a plasma treatment is performed.

6. The pressure vessel of claim 5, wherein the at least one pre-treatment region is formed as a plurality of strip-shaped regions having a length along the outer surface of the liner in the central axial direction, and the plurality of pre-treatment regions are formed to be spaced apart from each other.

7. The pressure vessel of claim 5, wherein the pre-treatment regions are formed into a lattice shape.

8. The pressure vessel of claim 5, wherein a separation region in which at least portions of the liner and the composite material are separated from each other is formed on the liner and the composite material.

9. The pressure vessel of claim 8, wherein when the release agent-treatment is preformed, at least portion of the separation region is formed at a position corresponding to the pre-treatment region.

10. The pressure vessel of claim 8, wherein when the plasma treatment is preformed, at least portion of the separation region is formed to correspond a region except for the pre-treatment region.

* * * * *